US012522890B2

United States Patent
Xu et al.

(10) Patent No.: US 12,522,890 B2
(45) Date of Patent: Jan. 13, 2026

(54) TREATMENT SYSTEM FOR REMOVING IRON-ALUMINUM-CHROMIUM REACTION PRODUCTS IN LEACHING SOLUTION OF LATERITE NICKEL ORE

(71) Applicants: PT QMB NEW ENERGY MATERIALS, Dki Jakarta (ID); PT ESG NEW ENERGY MATERIAL, Dki Jakarta (ID); GEM CO., LTD., Guangdong (CN); PT GEM INDONESIA NEW ENERGY MATERIALS, Dki Jakarta (ID)

(72) Inventors: Kaihua Xu, Guangdong (CN); Satryo Soemantri Brodjonegoro, Dki Jakarta (ID); Andi Syaputra Hasibuan, Dki Jakarta (ID); Wei Liu, Dki Jakarta (ID); Emil Salim, Dki Jakarta (ID); Anissya Putri Maharani Muharam, Dki Jakarta (ID); Ulfi Rohmawati, Dki Jakarta (ID); Tegar Mukti Aji, Dki Jakarta (ID); Arnaldo Marulitua Sinaga, Dki Jakarta (ID)

(73) Assignees: PT QMB NEW ENERGY MATERIALS, Jakarta Selatan (ID); PT ESG NEW ENERGY MATERIAL, Jakarta Selatan (ID)

( * ) Notice: Subject to any disclaimer, the term of this patent is extended or adjusted under 35 U.S.C. 154(b) by 0 days.

(21) Appl. No.: 18/870,459

(22) PCT Filed: Jul. 31, 2023

(86) PCT No.: PCT/CN2023/110213
§ 371 (c)(1),
(2) Date: Nov. 29, 2024

(87) PCT Pub. No.: WO2025/025051
PCT Pub. Date: Feb. 6, 2025

(65) Prior Publication Data
US 2025/0163537 A1    May 22, 2025

(51) Int. Cl.
*C22B 3/02*      (2006.01)
*C22B 3/00*      (2006.01)
(Continued)

(52) U.S. Cl.
CPC ............ *C22B 3/02* (2013.01); *C22B 21/0015* (2013.01); *C22B 23/0453* (2013.01); *C22B 34/32* (2013.01)

(58) Field of Classification Search
None
See application file for complete search history.

(56) References Cited

U.S. PATENT DOCUMENTS

2018/0280991 A1    10/2018    Higuchi

FOREIGN PATENT DOCUMENTS

| CN | 205710870 U | 11/2016 |
| CN | 207405019 U | 5/2018 |
| CN | 209636295 U | 11/2019 |
| CN | 213172496 U | 5/2021 |
| CN | 216173250 U | 4/2022 |
| WO | 2023020041 A1 | 2/2023 |

OTHER PUBLICATIONS

CN 216173250 U machine translation, originally published Apr. 5, 2022, translated May 7, 2025 (Year: 2022).*

(Continued)

*Primary Examiner* — Keith D. Hendricks
*Assistant Examiner* — Nikolas Takuya Pullen

(57) ABSTRACT

Disclosed is a treatment system for removing iron-aluminum-chromium reaction products in leaching solution of laterite nickel ore, comprising a reaction tank, a lifting assembly, a flushing assembly, and a receiving box. The lifting assembly comprises a rotating shaft, a net pouch, and a connecting rod. The rotating shaft is rotatably connected to the reaction tank and is connected to the net pouch via the (Continued)

connecting rod; the rotation path of the net pouch covers and adheres to the inner bottom wall of the reaction tank, and it can be rotated to a first position and a second position; the receiving box can slide to a position directly below the net pouch at the second position. This solution addresses the current issues of requiring multiple thickeners for solid-liquid separation, which results in large equipment size and inconvenience in use.

10 Claims, 3 Drawing Sheets

(51) Int. Cl.
*C22B 21/00* (2006.01)
*C22B 34/32* (2006.01)

(56) References Cited

OTHER PUBLICATIONS

CN 209636295 U machine translation, originally published Nov. 15, 2019, translated May 7, 2025 (Year: 2019).*
International Search Report issued in corresponding International application No. PCT/CN2023/110213, mailed Nov. 13, 2023 (10 pages).
Written Opinion of the International Search Authority in corresponding International application No. PCT/CN2023/110213, mailed Nov. 13, 2023 (6 pages).

* cited by examiner

TREATMENT SYSTEM FOR REMOVING IRON-ALUMINUM-CHROMIUM REACTION PRODUCTS IN LEACHING SOLUTION OF LATERITE NICKEL ORE

FIELD OF THE DISCLOSURE

The disclosure relates to the technical field of laterite nickel ore processing, in particular to a treatment system for removing iron-aluminum-chromium reaction products in leaching solution of laterite nickel ore.

BACKGROUND

Nickel and cobalt, as partial raw materials for battery production, have seen a sharp increase in demand with the rapid development of the battery industry. Currently, laterite nickel ore can be processed using high-pressure acid leaching to obtain nickel and cobalt raw materials. This process involves multiple stages of removing iron-aluminum-chromium, which are continuous reactions that produce slag phases containing iron, aluminum, and chromium.

To achieve the separation of the slag phase, a Chinese patent with application number CN201310261041.1 proposes a tailings solid-liquid separation equipment and method. This equipment comprises a high-frequency vibrating slag screen, a rubber-lined wear-resistant slurry pump, a hydrocyclone, a high-frequency vibrating dewatering screen, an efficient inclined tube thickening tank, a plunger pump, and a box-type high-pressure filter press. Specifically, the underflow outlet of the high-frequency vibrating slag screen is connected to the inlet of the rubber-lined wear-resistant slurry pump, the material inlet of the hydrocyclone is connected to the outlet of the rubber-lined wear-resistant slurry pump, the material inlet of the high-frequency vibrating dewatering screen is connected to the underflow outlet of the hydrocyclone, and its underflow outlet is reconnected to the inlet of the rubber-lined wear-resistant slurry pump.

However, currently, multiple thickeners are required to separate slag phase generated from removing iron-aluminum-chromium reaction in leaching solution of laterite nickel ore, resulting in large equipment volume and inconvenience in use.

SUMMARY

The purpose of this disclosure is to provide a treatment system for removing iron-aluminum-chromium reaction products in leaching solution of laterite nickel ore to solve the technical problem that multiple thickeners are required to separate slag phase generated from removing iron-aluminum-chromium reaction in leaching solution of laterite nickel ore, resulting in large equipment volume and inconvenience in use.

In order to solve the above technical problems, this disclosure provides a treatment system for removing iron-aluminum-chromium reaction products in leaching solution of laterite nickel ore, comprising a reaction tank, a lifting assembly, a flushing assembly, and a receiving box, wherein:
the lifting assembly comprises a rotating shaft, a net pouch, and a connecting rod; the rotating shaft is rotatably connected to the reaction tank; the rotating shaft is connected to the net pouch via the connecting rod; a lifting chamber is formed within the net pouch for salvaging slag phase; rotational path of the net pouch covers and adheres to the inner bottom wall of the reaction tank, and the net pouch can rotate to a first position and a second position above the liquid level inside the reaction tank; when the net pouch rotates to the first position, the opening of the net pouch is inclined upwards; when the net pouch rotates to the second position, the opening of the net pouch is inclined downwards;
the flushing assembly is connected to the reaction tank, with its flushing end directed at the opening of the net pouch in the first position, to wash off the liquid phase adhered to the net pouch and the slag phase;
the receiving box is slidably connected to the reaction tank and can slide to a position directly below the net pouch in the second position, to receive the slag phase dumped from the net pouch.

Furthermore, the width of the net pouch is compatible with the width of the reaction tank; the number of connecting rods is plural, and these connecting rods are arranged sequentially along the axial direction of the rotating shaft.

Furthermore, the net pouch is made of PTFE material; multiple liquid-permeable holes are opened on the side of the net pouch away from its opening.

Furthermore, the lifting assembly further comprises a driving device; the driving device is fixedly connected to the side wall of the reaction tank, and its output end is connected to the rotating shaft to drive the rotation of the rotating shaft.

Furthermore, the flushing assembly comprises a drainage box, a flushing component, and a collecting tube; the drainage box is installed above the liquid level inside the reaction tank and is slidingly connected to the reaction tank in a direction that allows it to move closer to or farther away from the first position; on the side of the drainage box that is closer to the first position, a cleaning port is opened; the drainage box can slide to a position where the net pouch, which is at the first position, is placed inside the drainage box; the flushing component is installed on the inner top wall of the drainage box and is positioned directly opposite to the opening of the net pouch when it is at the first position; the collecting tube is connected to the inner bottom of the drainage box.

Furthermore, a slope is set on the inner bottom wall of the receiving box; the slope is inclined downwards in a direction away from the cleaning port; the collecting tube is connected to the lower part of the receiving box where the slope is located.

Furthermore, the flushing component comprises a flushing pump, an inlet tube, an outlet tube, and multiple nozzles; the flushing pump is fixedly connected to the drainage box; one end of the flushing pump is externally connected to clean water via the inlet tube, and the other end of the flushing pump is connected to multiple nozzles via the outlet tub; these multiple nozzles form the rinsing end.

Furthermore, a plane in which the multiple nozzles are located is parallel to a plane in which the opening of the net pouch at the first position is located; the multiple nozzles are arranged in a matrix array on their respective plane.

Furthermore, the flushing assembly further comprises a pushing component; the pushing component is fixedly connected to the side wall of the reaction tank, and its output end is connected to the drainage box to drive the sliding of the drainage box.

Furthermore, the bottom of the receiving box has a material outlet connected to its interior; a slot penetrating through the material outlet is opened at the bottom of the receiving box, and an inserting plate is slidingly connected to the slot to open or close the material outlet.

Compared with existing technologies, the beneficial effects of this disclosure are: the pre-leaching solution undergoes a continuous reaction process for removing iron-aluminum-chromium in the reaction tank, with a slag phase containing iron, aluminum, and chromium constantly precipitating out from the pre-leaching solution. Through the rotation of the rotating shaft, the net pouch is driven to rotate against the inner bottom wall of the reaction tank, directing the slag phase generated in the reaction tank through an opening into the lifting chamber. Firstly, the net pouch is rotated to a first position, where the opening of the net pouch is inclined upwards. The flushing end of the flushing assembly can then rinse off the liquid phase (including the pre-leaching solution) adhering to the net pouch and the slag phase, preventing the liquid phase from being exported along with the slag phase and avoiding the waste of nickel, cobalt, and manganese contained in the liquid phase. Finally, the net pouch is rotated to a second position, where the opening of the net pouch is inclined downwards, allowing the slag phase inside the net pouch to fall into the receiving box under its own weight. By repeating the above steps, the solid-liquid separation work during the continuous reaction process for removing iron-aluminum-chromium can be accommodated. The above solid-liquid separation-related structures are positioned inside the reaction tank, eliminating the need for thickeners, reducing the equipment footprint, and facilitating ease of use.

DETAILED DESCRIPTION OF PREFERRED EMBODIMENTS

Figure 1:
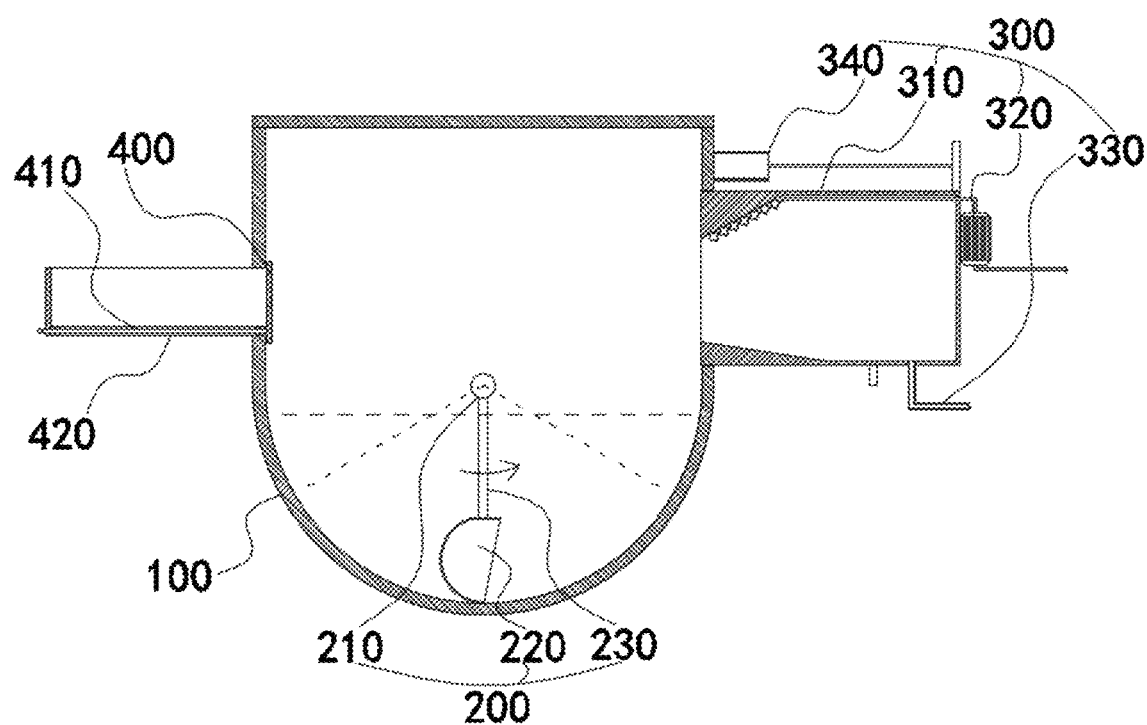
FIG. 1 is a schematic diagram of the structure of the treatment system for removing iron-aluminum-chromium reaction products in leaching solution of laterite nickel ore as provided in an embodiment of this disclosure, showing the net pouch retrieving the slag phase from within the reaction tank.
Figure 2:
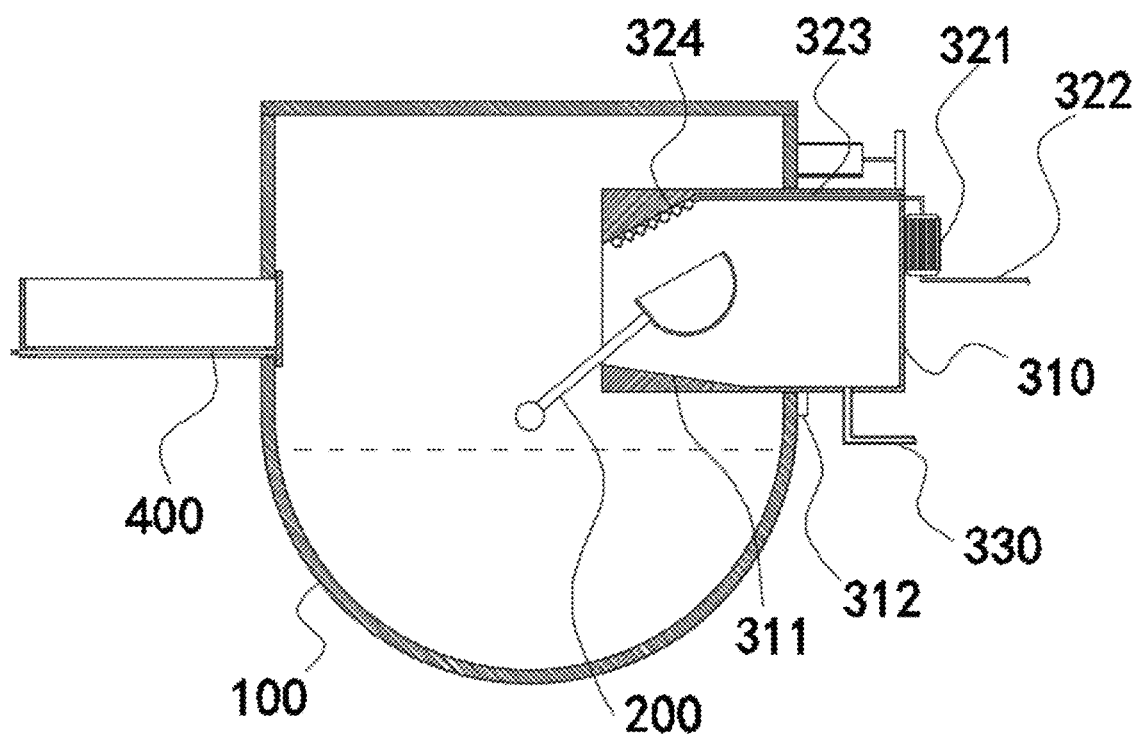
FIG. 2 is a schematic diagram of the structure of the treatment system for removing iron-aluminum-chromium reaction products in leaching solution of laterite nickel ore, as provided in an embodiment of this disclosure, showing the net pouch rotated to the first position.
Figure 3:
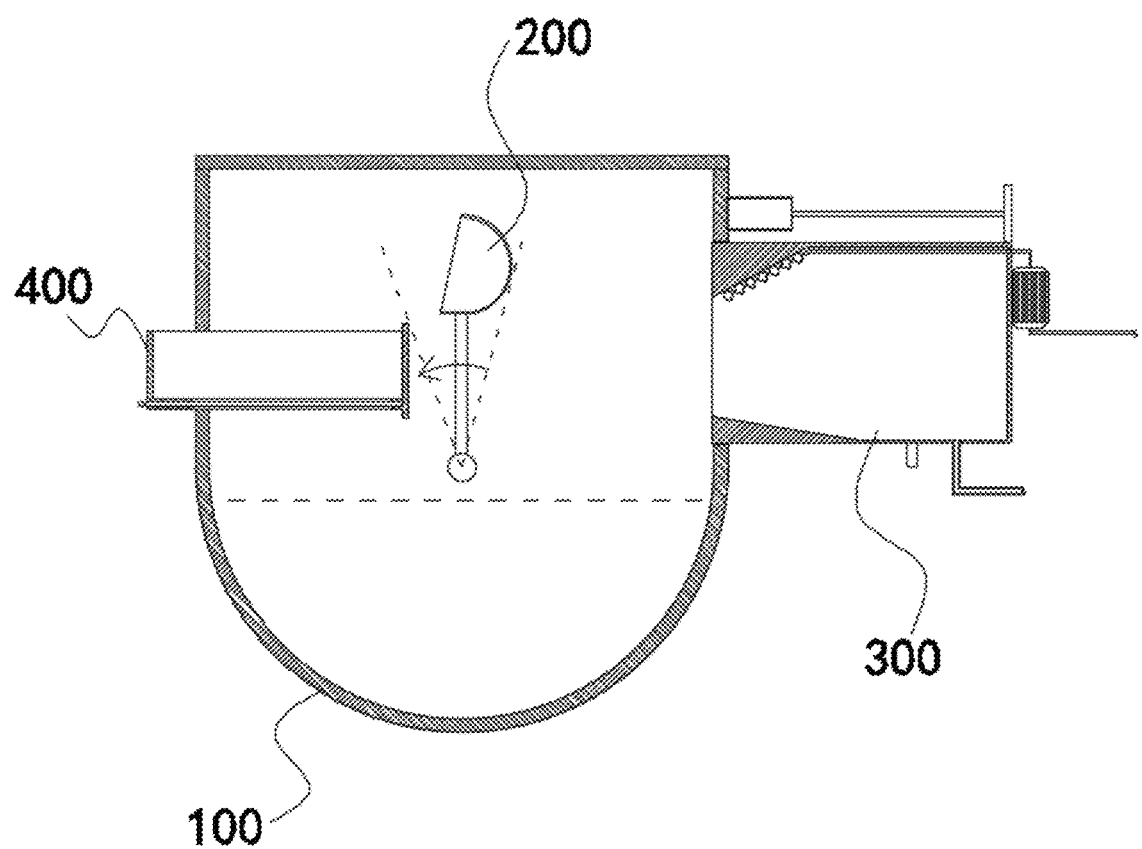
FIG. 3 is a schematic diagram of the structure of the treatment system for removing iron-aluminum-chromium reaction products in leaching solution of laterite nickel ore, as provided in an embodiment of this disclosure, showing the net pouch rotated to the second position.

The preferred embodiments of this disclosure will be described in detail with reference to the accompanying drawings, which constitute a part of this disclosure and are used together with the embodiments to illustrate the principles of this disclosure, and are not intended to limit the scope of this disclosure.

The disclosure presented here describes a treatment system for removing iron-aluminum-chromium reaction products in leaching solution of laterite nickel ore. This system comprises a reaction tank 100, a lifting assembly 200, a flushing assembly 300, and a receiving box 400. The lifting assembly 200 comprises a rotating shaft 210, a net pouch 220, and a connecting rod 230. The rotating shaft 210 is rotatably connected to the reaction tank 100. The rotating shaft 210 is connected to the net pouch 220 via the connecting rod 230. A lifting chamber is formed within the net pouch 220 for salvaging slag phase; the rotational path of the net pouch 220 covers and adheres to the inner bottom wall of the reaction tank 100, and the net pouch 220 can rotate to a first position and a second position above the liquid level inside the reaction tank 100. When the net pouch 220 rotates to the first position, the opening of the net pouch 220 is inclined upwards. When the net pouch 220 rotates to the second position, the opening of the net pouch 220 is inclined downwards. The flushing assembly 300 is connected to the reaction tank 100, with its flushing end directed at the opening of the net pouch 220 in the first position, to wash off the liquid phase adhered to the net pouch 220 and the slag phase. The receiving box 400 is slidably connected to the reaction tank 100 and can slide to a position directly below the net pouch 220 in the second position, to receive the slag phase dumped from the net pouch 220.

During implementation, the pre-leaching solution undergoes a continuous removing iron-aluminum-chromium reaction process within the reaction tank 100. As the reaction progresses, slag phase containing iron, aluminum, and chromium continuously precipitates out from the pre-leaching solution. The rotation of the rotating shaft 210 drives the net pouch 220 to rotate along the inner bottom wall of the reaction tank 100, thereby guiding the slag phase generated in the reaction tank 100 into the lifting chamber through the opening of the net pouch 220. Firstly, the net pouch 220 is rotated to the first position, where the opening of the net pouch 220 is inclined upwards. The flushing end of the flushing assembly 300 is then used to wash off the liquid phase (including the pre-leaching solution) adhered to the net pouch 220 and the slag phase, preventing the liquid phase from being exported along with the slag phase and thus avoiding the waste of nickel, cobalt, and manganese contained in the liquid phase. Finally, the net pouch 220 is rotated to the second position, where the opening of the net pouch 220 is inclined downwards. The slag phase inside the net pouch 220 then falls into the receiving box 400 under its own weight.

By repeating the above steps, the system can accommodate the solid-liquid separation work during the continuous removing iron-aluminum-chromium reaction process. The solid-liquid separation-related structure described above is positioned inside the reaction tank 100, eliminating the need for thickeners, reducing equipment footprint, and facilitating ease of use.

In this implementation, the reaction tank 100 serves as a container for the multi-stage removing iron-aluminum-chromium process of the pre-leaching solution obtained from high-pressure pre-leaching treatment. Specifically, the pre-leaching solution is introduced into the reaction tank 100, and the pH value of the pre-leaching solution is adjusted to facilitate the process of removing iron, aluminum, and chromium.

In this implementation, the lifting assembly 200 is a structure used to scoop up the slag phase generated in the reaction tank 100.

In this setup, the rotating shaft 210 is horizontally positioned, enabling the net pouch 220 to rotate circumferentially along the horizontal axis. Meanwhile, to ensure that the scooping area of the net pouch 220 effectively covers the entire inner bottom of the reaction tank 100, the width of the net pouch 220 is compatible with the width of the reaction tank 100. The number of connecting rods 230 is plural, and these connecting rods 230 are arranged sequentially along the axial direction of the rotating shaft 210.

In an embodiment, the inner bottom wall of the reaction tank 100 is arcuate in shape, compatible with the rotational path of the net pouch 220.

Given the strongly acidic environment inside the reaction tank 100, in an embodiment, the net pouch 220 is made of PTFE material. Additionally, multiple liquid-permeable holes are opened on the side of the net pouch 220 away from its opening, facilitating the return of the liquid phase inside the net pouch 220 back into the reaction tank 100.

To facilitate the rotation of the net pouch 220, in an embodiment, the lifting assembly 200 further comprises a driving device. The driving device is fixedly connected to the side wall of the reaction tank 100, and its output end is connected to the rotating shaft 210 to drive the rotation of the rotating shaft 210. The driving device can be implemented using a motor and a reducer.

It is understandable that the aforementioned net pouch 220 and multiple connecting rods 230 can also serve as stirring structures for the reaction tank 100. As the net pouch 220 and the multiple connecting rods 230 rotate, they stir the pre-leaching solution and subsequently added acid solution within the reaction tank 100, thereby accelerating the reaction process of removing iron, aluminum, and chromium.

The flushing assembly 300 mentioned in this embodiment serves to rinse the slag phase retrieved by the net pouch 220, dislodging the liquid phase adhered to the net pouch 220 and the slag phase. This ensures that the liquid phase can be redirected back into the reaction tank 100 or the high-pressure pre-leaching process, thereby preventing the loss of liquid phase and the subsequent waste of nickel-cobalt-manganese raw materials contained within. Specifically, the flushing assembly 300 is connected to the reaction tank 100, with its rinsing end positioned directly opposite the opening of the net pouch 220 when it is in the first position. This arrangement allows for effective rinsing of both the net pouch 220 and the liquid phase adhered to the slag phase.

In an embodiment, the flushing assembly 300 comprises a drainage box 310, a flushing component 320, and a collecting tube 330. The drainage box 310 is installed above the liquid level inside the reaction tank 100 and is slidingly connected to the reaction tank 100 in a direction that allows it to move closer to or farther away from the first position. On the side of the drainage box 310 that is closer to the first position, a cleaning port is opened. The drainage box 310 can slide to a position where the net pouch 220, which is at the first position, is placed inside the drainage box 310. The flushing component 320 is installed on the inner top wall of the drainage box 310 and is positioned directly opposite to the opening of the net pouch 220 when it is at the first position. The collecting tube 330 is connected to the inner bottom of the drainage box 310.

To facilitate the collection of rinsing water and the rinsed-off liquid phase, in an embodiment, a slope 311 is set on the inner bottom wall of the receiving box 400. The slope 311 is inclined downwards in a direction away from the cleaning port. The collecting tube 330 is connected to the lower part of the receiving box 400 where the slope 311 is located.

In an embodiment, the flushing component 320 comprises a flushing pump 321, an inlet tube 322, an outlet tube 323, and multiple nozzles 324. The flushing pump 321 is fixedly connected to the drainage box 310. One end of the flushing pump 321 is externally connected to clean water via the inlet tube 322, and the other end of the flushing pump 321 is connected to multiple nozzles 324 via the outlet tube 323. These multiple nozzles 324 form the rinsing end.

To ensure effective rinsing of the slag phase and the net pouch 220 by the clean water dispensed from the multiple nozzles 324, in an embodiment, the plane in which the multiple nozzles 324 are located is parallel to the plane in which the opening of the net pouch 220 at the first position is located. The multiple nozzles 324 are arranged in a matrix array on their respective plane.

To facilitate the sliding of the drainage box 310, the flushing assembly 300 further comprises a pushing component 340. The pushing component 340 is fixedly connected to the side wall of the reaction tank 100, and its output end is connected to the drainage box 310 to drive the sliding of the drainage box 310.

It is understandable that the drainage box 310 can slide to a position that is staggered from the rotation path of the net pouch 220, so that it does not interfere with the rotation of the net pouch 220.

In an embodiment, a limiting block 312 is fixedly connected to the bottom of the drainage box 310. When the drainage box 310 slides to a position where the flushing component 320 is directly opposite to the net pouch 220 at the first position, the limiting block 312 abuts against the reaction tank 100.

The receiving box 400 in this embodiment is a structure used to receive the slag phase from the net pouch 220. The receiving box 400 is slidingly connected to the reaction tank 100 and can slide to a position directly below the net pouch 220 at the second position to receive the slag phase poured out from the net pouch 220.

To facilitate the discharge of the slag phase from the receiving box 400, in this embodiment, the bottom of the receiving box 400 has a material outlet 420 connected to its interior. A slot penetrating through the material outlet 420 is opened at the bottom of the receiving box 400, and an inserting plate 410 is slidingly connected to the slot to open or close the material outlet 420.

It is understandable that during the rotation of the net pouch 220 from the first position to the second position, due to inertia, the slag phase inside the net pouch 220 will not fall out. The slag phase inside the net pouch 220 will only fall out when the net pouch 220 stops at the second position.

It is understandable that the receiving box 400 can slide to a position that is staggered from the rotation path of the net pouch 220, so that it does not interfere with the rotation of the net pouch 220. Specifically, the receiving box 400 can be rotated to a position where the material outlet 420 is located outside the reaction tank 100. A conveyor can be set up below the material outlet 420 to facilitate the reception and transportation of the slag phase discharged through the material outlet 420.

Compared with the prior art, the beneficial effects of this disclosure are as follows: the pre-leaching solution undergoes a continuous removing iron-aluminum-chromium process in the reaction tank 100, with the continuous precipitation of slag containing iron, aluminum, and chromium. The rotation of the rotating shaft 210 drives the net pouch 220 to rotate against the inner bottom wall of the reaction tank 100, thereby guiding the slag generated in the reaction tank 100 into the lifting chamber through the opening. Firstly, the net pouch 220 is rotated to a first position, where the opening of the net pouch 220 is inclined upwards. The flushing end of the flushing assembly 300 can wash off the liquid phase (including pre-leaching solution) adhering to the net pouch 220 and the slag, preventing the liquid phase from being discharged along with the slag, which would otherwise result in the waste of nickel, cobalt, and manganese contained in the liquid phase. Finally, the net pouch 220 is rotated to a second position, where the opening of the net pouch 220 is inclined downwards. The slag inside the net pouch 220 falls into the receiving box 400 under its own weight. By repeating the above steps, it can adapt to the solid-liquid separation work in the continuous removing iron-aluminum-chromium process. The structures related to the above solid-liquid separation are positioned inside the reaction tank 100, eliminating the need for thickeners, reducing the equipment footprint, and facilitating ease of use.

The above is only a preferred specific embodiment of this disclosure, but the scope of protection of this disclosure is not limited to this. Any changes or substitutions that can be easily conceived by those skilled in the art within the scope of the disclosed technology should be included in the scope of protection of this disclosure.

What is claimed is:

1. A treatment system for removing iron-aluminum-chromium reaction products in a leaching solution of laterite nickel ore, comprising a reaction tank, a lifting assembly, a flushing assembly, and a receiving box, wherein:
   the lifting assembly comprises a rotating shaft, a net pouch, and a connecting rod; the rotating shaft is rotatably connected to the reaction tank; the rotating shaft is connected to the net pouch via the connecting rod; a lifting chamber is formed within the net pouch for salvaging slag phase; a rotational path of the net pouch covers and adheres to an inner bottom wall of the reaction tank, and the net pouch can rotate to a first position and a second position above a liquid level inside the reaction tank; when the net pouch rotates to the first position, an opening of the net pouch is inclined upwards; when the net pouch rotates to the second position, the opening of the net pouch is inclined downwards;
   the flushing assembly is connected to the reaction tank, with a flushing end of the flushing assembly directed at the opening of the net pouch in the first position, to wash off liquid phase adhered to the net pouch and the slag phase;
   the receiving box is slidably connected to the reaction tank and can slide to a position directly below the net pouch in the second position, to receive washed slag phase that gravitationally falls into the receiving box from the net pouch.

2. The treatment system for removing iron-aluminum-chromium reaction products in leaching solution of laterite nickel ore according to claim 1, wherein a number of connecting rods is plural, and these connecting rods are arranged sequentially along the axial direction of the rotating shaft.

3. The treatment system for removing iron-aluminum-chromium reaction products in leaching solution of laterite nickel ore according to claim 1, wherein multiple liquid-permeable holes are defined in a side of the net pouch away from the opening of the net pouch.

4. The treatment system for removing iron-aluminum-chromium reaction products in leaching solution of laterite nickel ore according to claim 1, wherein the lifting assembly further comprises a driving device; the driving device is fixedly connected to a side wall of the reaction tank, and an output end of the driving device is connected to the rotating shaft to drive a rotation of the rotating shaft.

5. The treatment system for removing iron-aluminum-chromium reaction products in leaching solution of laterite nickel ore according to claim 1, wherein the flushing assembly comprises a drainage box, a flushing component, and a collecting tube; the drainage box is installed above the liquid level inside the reaction tank and is slidingly connected to the reaction tank in a direction that allows it to move closer to or farther away from the first position; on a side of the drainage box that is closer to the first position, a cleaning port is opened;
   the drainage box can slide to a position where the net pouch, which is at the first position, is placed inside the drainage box; the flushing component is installed on an inner top wall of the drainage box and is positioned directly opposite to the opening of the net pouch when it is at the first position; the collecting tube is connected to an inner bottom of the drainage box.

6. The treatment system for removing iron-aluminum-chromium reaction products in leaching solution of laterite nickel ore according to claim 5, wherein a slope is set on an inner bottom wall of the receiving box; the slope is inclined downwards in a direction away from the cleaning port; the collecting tube is connected to a lower part of the receiving box where the slope is located.

7. The treatment system for removing iron-aluminum-chromium reaction products in leaching solution of laterite nickel ore according to claim 5, wherein the flushing component comprises a flushing pump, an inlet tube, an outlet tube, and multiple nozzles; the flushing pump is fixedly connected to the drainage box; one end of the flushing pump is externally connected to the inlet tube, and the other end of the flushing pump is connected to multiple nozzles via an outlet tub; these multiple nozzles form a rinsing end.

8. The treatment system for removing iron-aluminum-chromium reaction products in leaching solution of laterite nickel ore according to claim 7, wherein a plane in which the multiple nozzles are located is parallel to a plane in which the opening of the net pouch at the first position is located; the multiple nozzles are arranged in a matrix array on their respective plane.

9. The treatment system for removing iron-aluminum-chromium reaction products in leaching solution of laterite nickel ore according to claim 5, wherein the flushing assembly further comprises a pushing component; the pushing component is fixedly connected to a side wall of the reaction tank, and an output end of the reaction tank is connected to the drainage box to drive a sliding of the drainage box.

10. The treatment system for removing iron-aluminum-chromium reaction products in leaching solution of laterite nickel ore according to claim 1, wherein a bottom of the receiving box has a material outlet connected to an interior of the receiving box; a slot penetrating through the material outlet is defined in the bottom of the receiving box, and an inserting plate is slidingly connected to the slot to open or close the material outlet.

* * * * *